United States Patent
Frenkel et al.

(10) Patent No.: US 9,846,751 B2
(45) Date of Patent: Dec. 19, 2017

(54) TAKEPART ACTION PLATFORM FOR WEBSITES

(71) Applicant: TakePart, LLC, Beverly Hills, CA (US)

(72) Inventors: Gary Frenkel, Beverly Hills, CA (US); Richard Skelton, Beverly Hills, CA (US)

(73) Assignee: Participant Media, LLC, Beverly Hills, CA (US)

( * ) Notice: Subject to any disclaimer, the term of this patent is extended or adjusted under 35 U.S.C. 154(b) by 0 days.

(21) Appl. No.: 14/456,227

(22) Filed: Aug. 11, 2014

(65) Prior Publication Data

US 2015/0046793 A1 Feb. 12, 2015

Related U.S. Application Data

(60) Provisional application No. 61/864,180, filed on Aug. 9, 2013.

(51) Int. Cl.
*G06F 17/30* (2006.01)
*G06Q 50/00* (2012.01)

(52) U.S. Cl.
CPC .. *G06F 17/30896* (2013.01); *G06F 17/30905* (2013.01); *G06Q 50/01* (2013.01); *G06F 17/3089* (2013.01)

(58) Field of Classification Search
CPC .................................................. G06F 17/3089
See application file for complete search history.

(56) References Cited

U.S. PATENT DOCUMENTS

| | | | | |
|---|---|---|---|---|
| 8,176,431 | B1* | 5/2012 | Scannell | G06F 9/4443 715/762 |
| 2005/0257167 | A1 | 11/2005 | Fraleigh et al. | |
| 2010/0058195 | A1* | 3/2010 | Stefik | G06F 17/3089 715/744 |
| 2010/0217645 | A1 | 8/2010 | Jin et al. | |
| 2012/0102013 | A1* | 4/2012 | Martini | G06F 17/3087 707/706 |
| 2012/0167007 | A1 | 6/2012 | Ross et al. | |
| 2012/0266060 | A1 | 10/2012 | Roberts et al. | |
| 2013/0185220 | A1* | 7/2013 | Good | G06Q 50/01 705/329 |

OTHER PUBLICATIONS

International Search Report for Application No. PCT/US2014/050545 dated Nov. 24, 2014.

* cited by examiner

*Primary Examiner* — Andrew T McIntosh

(57) ABSTRACT

In one embodiment, a device receives a request for a webpage from a client device via a network. The device identifies a societal issue associated with content of the webpage. The device determines a set of one or more online support actions associated with the identified societal issue. The device embeds an interface for a particular one of the set of online support actions into the webpage. The device provides the requested webpage with the embedded interface to the client device via the network.

17 Claims, 13 Drawing Sheets

Against All Odds: Find Out How 12 Trapped Killers Whales Were Freed

But what cornered them in the first place? Some blame global warming.
By: David Kirby    January 10, 2013    Comment

[ICONIC IMAGE]

But by the grace of Mother Nature, a pod of 12 trapped orcas have been set free.
(Photo: Clement Rousseau / Facebook)

| T | TAKE ACTION |

☐ TWITTER
☐ FACEBOOK
☐ EMAIL
☐ GOOGLE+
☐ PINTEREST
☐ LINKEDIN
💬 COMMENTS

It looks as though a miracle of nature has set free, at least for now, the pod of killer whales trapped in the ice in Hudson Bay, though we won't know their ultimate fate until they are spotted again.

Shari L. Tarantino, President of the Board of Directors of the Orca Conservancy, spoke this morning by phone with the mayor of Inukajuak, Quebec, about 20 miles away from the breathing hole in the ice - where at least a dozen orcas have been stranded, captivating the world in a life-or-death drama.

PETETION
The Cove: Sign the Petetion to Help Save Japan's Dolphins

Powered by TakePart

| T | SEE MORE ACTIONS

SIGN NOW  >

FIG. 4A

TAKE ACTION   Browse Actions   Login to track your impact

— 420

PETITION                                          SHARE ☐ ☐ ☐ ☐

Tell USFWS to Take Emergency Action to Rescue the Mexican Gray Wolf!

54% COMPLETE

SIGN THE PETITION
Join 2,727 supporters, 5,000 needed!

First Name*

LastName*

Email*

Address*

City*

State* ◇         Outside the U.S.?

Zip Code*

SIGN THE PETITION

☑ Display my signature
☑ I'd like to receive emails from TakePart about how to protect the world's precious wildlife.
☑ I'd like to receive emails from Defenders of Wildlife.

[ICONIC IMAGE]

EMPOWERED BY

[LOGO]

For more than 65 years, Defenders of Wildlife has led the fight to save threatened and endangered species with innovative approaches that help wolves, polar bears, big cats, and other imperiled wildlife survive in an everchanging world.

Action Discovery

／-202

Categories

All
Featured
Goal Reached
Trending
Almost There

Filter by Topic

All
Food
Environment
Wildlife
Social Justice
Education
Health
Culture

Filter by Type

All
Petition
Pledge
Awarness

Reset Filters

FIND ACTIONS THAT MAKE A DIFFERENCE

TakePart is dedicated to connecting inspiring content to relevant and credible actions you can take to make a difference. We've partnered with leading organizations including non-profits to deliver trustworthy actions intended for real good.

↘ 470

NEWEST ACTIONS

472 ↘

| PLEDGE | 0% COMPLETE |
|---|---|
| [ICONIC IMAGE] | |

Be Loud, Be Proud! June is National LGBT Pride Month

[ TAKE THE PLEDGE > ]

0 PLEDGED — 2,000 GOAL

474 ↘

| PLEDGE | 0.6% COMPLETE |
|---|---|
| [ICONIC IMAGE] | |

Book People Unite! Impoverished Youth Need Books to Succeed.

[ TAKE THE PLEDGE > ]

12 PLEDGED — 2,000 GOAL

476 ↘

| PETITION | 2.8% COMPLETE |
|---|---|
| [ICONIC IMAGE] | |

Demand Presidential Leadership on Climate Change

[ SIGN THE PETITION > ]

140 SIGNED — 5,000 GOAL

See More New Actions >

FEATURED ACTIONS

478 ↘

| PETITION | 24% COMPLETE |
|---|---|
| [ICONIC IMAGE] | |

Big Oil: What Are You Hiding?

[ SIGN THE PETITION > ]

1,203 SIGNED — 5,000 GOAL

480 ↘

| PETITION | 22% COMPLETE |
|---|---|
| [ICONIC IMAGE] | |

President Obama: It's Time: We Demand Zero Nuclear Weapons.

[ SIGN THE PETITION > ]

1,142 SIGNED — 7 DAYS LEFT — 5,000 GOAL

482 ↘

| PETITION | 52% COMPLETE |
|---|---|
| [ICONIC IMAGE] | |

Don't Drown Out Dolphins' Voices! Stop Dangerous Seismic Testing.

[ SIGN THE PETITION > ]

5,209 SIGNED — 10,000 GOAL

See More Featured Actions >

FIG. 4H

TAKEPART ACTION PLATFORM FOR WEBSITES

RELATED APPLICATIONS

This application claims priority to U.S. Provisional Application No. 61/864,180, filed Aug. 9, 2013, entitled: TAKE ACTION PLATFORM FOR WEBSITES, by Frenkel et al., the contents of which are herein incorporated by reference.

TECHNICAL FIELD

The present disclosure relates generally to websites, and, more particularly, to user interaction experience through websites.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). In particular, websites may provide information to users in the form of news, articles, web logs ("blogs"), games, online communities that provide content focusing on a common interest or theme (e.g., a "fan site" for a television program or musical artist), and so on.

SUMMARY OF THE INVENTION

According to one or more embodiments herein, a device receives a request for a webpage from a client device via a network. The device identifies a societal issue associated with content of the webpage. The device determines a set of one or more online support actions associated with the identified societal issue. The device embeds an interface for a particular one of the set of online support actions into the webpage. The device provides the requested webpage with the embedded interface to the client device via the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4H illustrate a user experience of one or more embodiments herein.

DESCRIPTION OF EXAMPLE EMBODIMENTS

Figure 1:
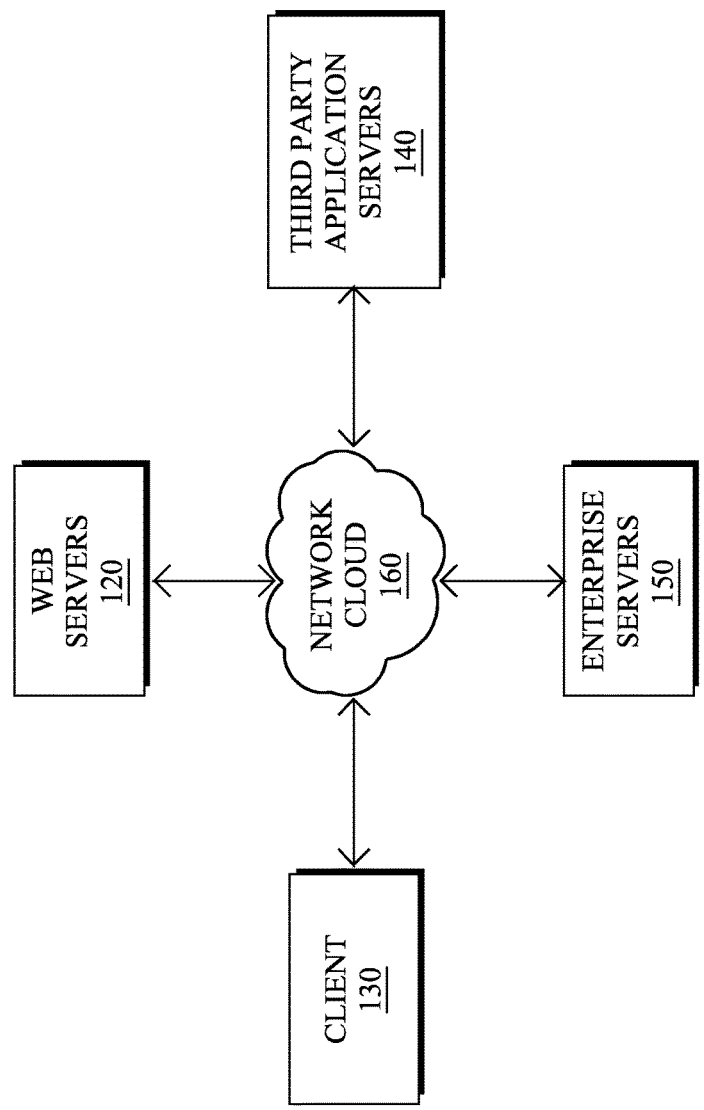
FIG. 1 illustrates an example network environment.

Particular embodiments may operate in, or in conjunction with, a wide area network environment, such as the Internet, including multiple network addressable systems. FIG. 1 illustrates an example network environment, in which various example embodiments may operate, with particular detailed views shown in FIGS. 2A and 2B. Network cloud 160 generally represents one or more interconnected networks, over which various systems and hosts described herein may communicate. Network cloud 160 may include packet-based wide area networks (such as the Internet), private networks, wireless networks, satellite networks, cellular networks, paging networks, and the like. As FIG. 1 illustrates, particular embodiments may operate in conjunction with a network environment comprising web servers 120 and client devices 230, as well as, in some embodiments, one or more third party application servers 140 or one or more enterprise servers 150. Client devices 130, web servers 120, third party application servers 140, and enterprise servers 150 may be operably connected to the network environment and network cloud 160 via a network service provider, a wireless carrier, a set of routers or networking switches, or any other suitable means.

Figure 2A:
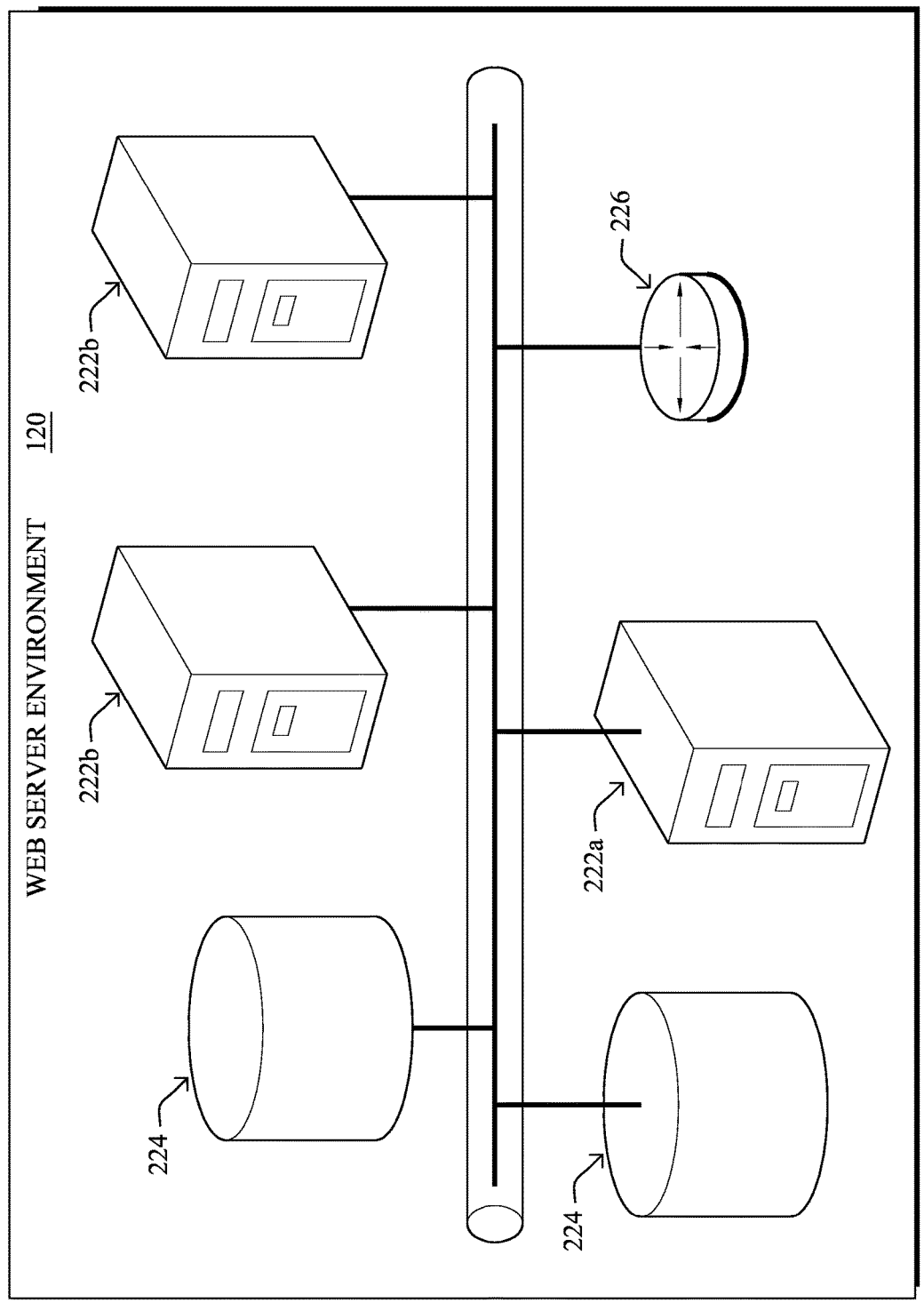
FIGS. 2A-2B illustrate example details of the network environment in FIG. 1.
Figure 2B:
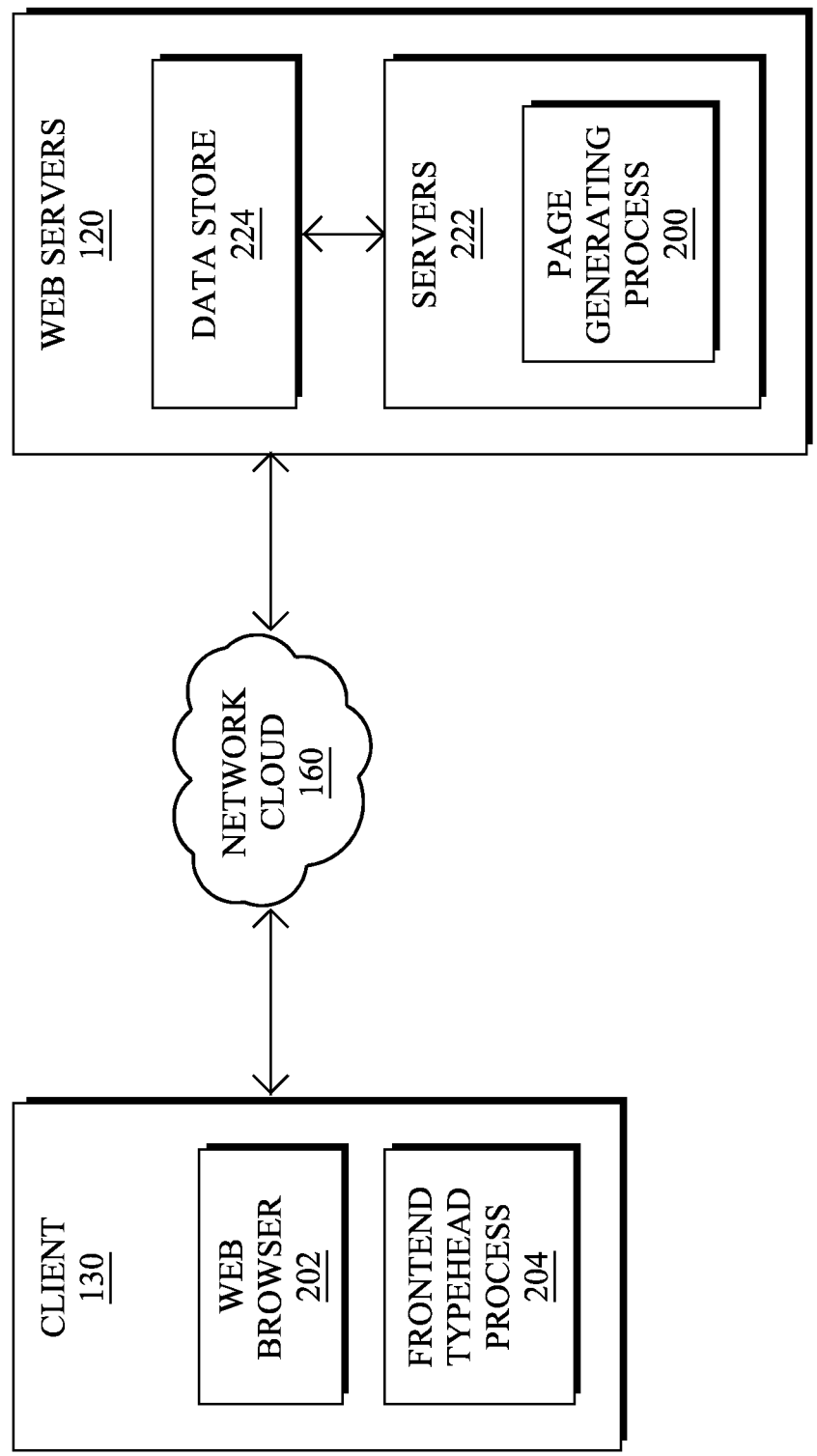

Each client device 130, web server 120, third party application server 140, or enterprise server 150 may generally be a computer, computing system, or computing device including functionality for communicating (e.g., remotely) over a computer network. Client device 130 in particular may be a desktop computer, laptop computer, personal digital assistant (PDA), in- or out-of-car navigation system, smart phone or other cellular or mobile device, or mobile gaming device, among other suitable computing devices. Client device 130 may execute one or more client applications, such as a web browser (e.g., MICROSOFT WINDOWS INTERNET EXPLORER, MOZILLA FIREFOX, APPLE SAFARI, GOOGLE CHROME, etc.) (web browser 202 as illustrated in FIG. 2B below), to access and view content over a computer network 160. In particular implementations, the client applications allow a user of client device 130 to enter addresses of specific network resources to be retrieved, such as resources hosted by web servers 120, application servers 140, or enterprise servers 150. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 130 desires to view a particular web page (hereinafter also referred to as a target structured document) hosted by web servers 120, or an application hosted by an application server 140 and made available in conjunction with web servers 120, the user's web browser 202, or other client-side structured document rendering engine or suitable client application, formulates and transmits a request to social network environment 120. The request generally includes a URL or other document identifier as well as metadata or other information. By way of example, the request may include information identifying the user, such as a user ID, as well as information identifying or characterizing the web browser 102 or operating system running on the user's client computing device 130. The request may also include location information identifying a geographic location of the user's client device or a logical network location of the user's client device, as well as timestamp identifying when the request was transmitted.

In an example implementation, when a request for a web page or structured document hosted by web servers 120 is received by the web servers, one or more page-generating processes (200 in FIG. 2B) executing within the servers 120 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 130 via a Hypertext Transfer Protocol (HTTP) or other suitable connection for rendering by the web browser 202 at the client device 130. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within web servers 120 or at one or more external locations, to the client device 130 requesting the web page. Typically, upon receipt of the response, the web browser 202 or other client document rendering application running at the client device 130 then constructs a document object model (DOM) representation of the received structured document and requests the resource(s) (which may be at one or more other external locations) embedded in the document.

In an example implementation, when a user first requests a web page from a web server 120 in a given user session, the response transmitted to the user's client device 130 may include a structured document generated by page-generating process 200 for rendering a login page at the client device. If a login is necessary, the user may then enter his or her user login credentials (e.g., user ID and password), which are then transmitted from the user's client device 130 to web servers 120. For example, the user may log into his or her user profile using the login credentials. Upon successful authentication of the user (if needed), the web servers 120 may then transmit a response to the user's web browser 202 at the user's client device 130 that includes a structured document generated by page-generating process 200 for rendering a webpage at the user's client device. Furthermore, in particular embodiments, and as will be described below, this or a subsequent response may further include one or more executable code segments (e.g., JavaScript) that, when received by the user's client device 130, implement a front-end (client-side) typeahead process 204 that executes in conjunction with the user's web browser 202.

In one example embodiment, web servers 120 comprise computing systems that allow users at client devices 130 to communicate or otherwise interact with each other and access content, such as news, articles, blogs, social pages, games, etc., as described herein. Web servers 120 are a network addressable system that, in various example embodiments, comprises one or more physical servers 222*a* or 222*b* (hereinafter also referred to collectively as servers 222) as well as one or more data stores collectively referred to herein as data store 224 (which may be implemented in or by one or more of a variety of consolidated or distributed computing systems, databases, or data servers), as illustrated in FIG. 2A. The one or more physical servers 222 are operably connected to computer network 160 via, by way of example, a set of routers or networking switches 226. In an example embodiment, the functionality hosted by the one or more physical servers 222 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 222 may host functionality directed to the operations of web servers 120. By way of example, web servers 120 may host a website that allows one or more users, at one or more client devices 130, to view and post information, as well as communicate with one another via the website. Hereinafter, servers 222 may be referred to as server 222, although, as just described, server 222 may include numerous servers hosting, for example, websites, as well as other content distribution servers, data stores, or databases. Data store 224 may store content and data relating to, and enabling, operation of the network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 224 corresponds to one or more of a variety of separate or integrated databases, such as relational databases and object-oriented databases, which maintain information as an integrated collection of logically related records or files stored on one or more physical systems. Structurally, data store 224 may generally include one or more of a large class of data storage and management systems. In particular embodiments, data store 224 may be implemented by any suitable physical system(s) including components, such as one or more database servers, mass storage media, media library systems, storage area networks, data storage clouds, and the like. In one example embodiment, data store 224 includes one or more servers, databases (e.g., MySQL), and/or data warehouses. Data store 224 may include data associated with different articles, blogs, social network environments, client devices 130, application servers 140, or enterprise servers 150, etc.

Figure 3:
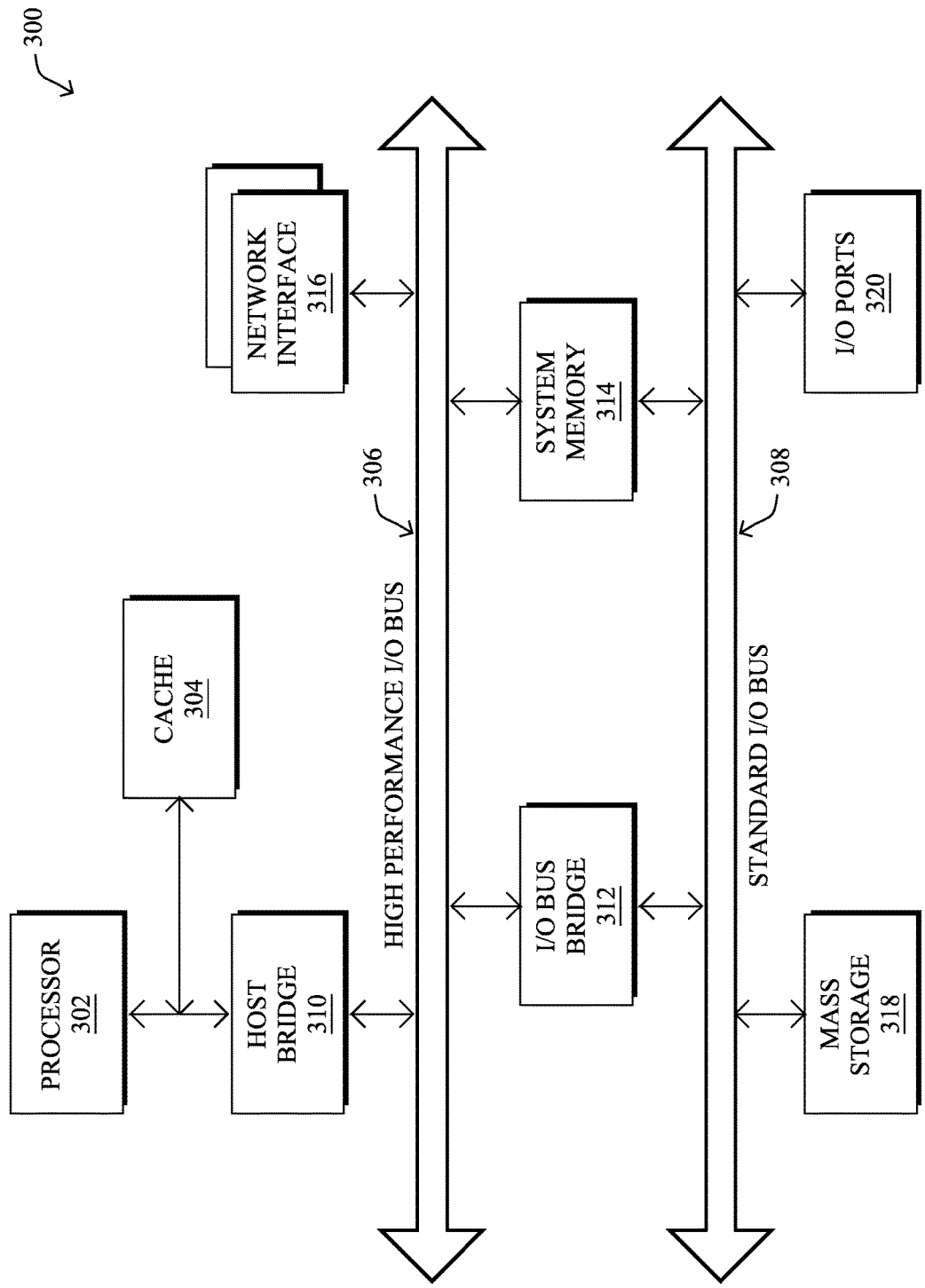
FIG. 3 illustrates an example computing system architecture.

FIG. 3 illustrates an example computing system architecture, which may be used to implement a server, a client device, etc. (e.g., any of devices 120, 130, 104, or 150 shown in FIG. 1). In one embodiment, hardware system 300 comprises a processor 302, a cache memory 304, and one or more executable modules and drivers, stored on a tangible computer readable medium, directed to the functions described herein. Additionally, hardware system 300 includes a high performance input/output (I/O) bus 306 and a standard I/O bus 308. A host bridge 310 couples processor 302 to high performance I/O bus 306, whereas I/O bus bridge 312 couples the two buses 306 and 308 to each other. A system memory 314 and one or more network/communication interfaces 316 couple to bus 306. Hardware system 300 may further include video memory (not shown) and a display device coupled to the video memory. Mass storage 318, and I/O ports 320 may be coupled to bus 308. Hardware system 300 may optionally include a keyboard and pointing device, and a display device (not shown) coupled to bus 308. Collectively, these elements are intended to represent a broad category of computer hardware systems, including but not limited to general purpose computer systems.

The elements of hardware system 300 are described in greater detail below. In particular, network interface 316 provides communication between hardware system 300 and any of a wide range of networks, such as an Ethernet (e.g., IEEE 802.3) network, a backplane, etc. Mass storage 318 provides permanent storage for the data and programming instructions to perform the above-described functions implemented in the servers or client devices, whereas system memory 314 (e.g., DRAM) provides temporary storage for the data and programming instructions when executed by processor 302. I/O ports 320 are one or more serial and/or parallel communication ports that provide communication between additional peripheral devices, which may be coupled to hardware system 300.

Hardware system 300 may include a variety of system architectures; and various components of hardware system 300 may be rearranged. For example, cache 304 may be on-chip with processor 302. Alternatively, cache 304 and processor 302 may be packed together as a "processor module," with processor 302 being referred to as the "processor core." Furthermore, certain embodiments of the present invention may not require nor include all of the above components. For example, the peripheral devices shown coupled to standard I/O bus 308 may couple to high performance I/O bus 306. In addition, in some embodiments, only a single bus may exist, with the components of hardware system 300 being coupled to the single bus. Furthermore, hardware system 300 may include additional components, such as additional processors, storage devices, or memories.

In one implementation, the operations of the embodiments described herein are implemented as a series of executable modules run by hardware system 300, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 302. Initially, the series of instructions may be stored on a storage device, such as mass storage 318. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 316. The instructions are copied from the storage device, such as mass storage 318, into memory 314 and then accessed and executed by processor 302.

An operating system manages and controls the operation of hardware system 300, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like.

Furthermore, the above-described elements and operations can be comprised of instructions that are stored on storage media (e.g., computer-readable media). The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Take Action Platform for Websites

The techniques herein are aimed at inspiring social change, while driving and measuring social impact in a unique way. In some aspects, a mechanism is disclosed whereby a user may perform any number of online actions regarding a societal issue associated with the content of a given webpage. In particular, a user experience is enriched in a manner that continued interest may be pursued, such as where the user is basically given an option of: "if you read this article, here are some actions you may be interested in taking." When selecting or "clicking" a take action button on the webpage, an overlay or new page may be presented to the user (e.g., embedded within the current web server hosting the content or else via a third party) with recommendations for enhanced content/actions related to the societal issue As one example, while reading an article about a devastating earthquake or a government action on a news website, the action platform allows a directed search to provide users with a variety of different action recommendations, such as online petitions they can sign, pledges/donations they can make online, other related content/articles, etc.

Specifically, according to one or more embodiments herein, a device receives a request for a webpage from a client device via a network. The device identifies a societal issue associated with content of the webpage. The device determines a set of one or more online support actions associated with the identified societal issue. The device embeds an interface for a particular one of the set of online support actions into the webpage. The device provides the requested webpage with the embedded interface to the client device via the network.

Illustratively, the techniques described herein may be performed by hardware, software, and/or firmware, such as in accordance with the page generating process 200, which may include computer executable instructions executed by a processor (e.g., processor 302) to perform functions relating to the techniques described herein. For example, the techniques herein may be treated as extensions to conventional protocols, and as such, may be processed by similar components understood in the art that execute those protocols, accordingly.

Operationally, an action interface may be embedded into a webpage to perform actions regarding a societal issue that is associated with the content of the webpage, thereby allowing a user to perform any number of online actions regarding the societal issue. According to various embodiments, FIGS. 4A-4H illustrate an example user experience using the techniques herein.

Referring now specifically to FIG. 4A, an example webpage 400 is shown as displayed within web browser 202 of client 130 (e.g., on an electronic display). In various embodiments, webpage 400 may include a "take action" button/widget 402 that, upon selection directs a user to other socially related content. For example, web servers 120 may serve webpage 400 to client 130 by executing the illustrative page generating process 200. For instance, the action platform (e.g., a take action button/widget 402 or take action banner 404) on websites allows the generation of socially-relevant actions based on digital content. While button/widget 402 and banner 404 are shown, it is to be appreciated that other interfaces may be used without deviating from the teachings herein.

Specifically, as shown, webpage 400 may include content that may be associated with one or more societal issues. In general, a societal issue refers to a political, environmental, scientific, etc., issue of particular importance to a local, national, or global society (e.g., on a global scale, national scale, local scale, etc.). For example, as shown, webpage 400 may be an article that includes images and text regarding a pod of killer whales that were trapped in ice in Hudson Bay. Content may include, but is not limited to, text (e.g., written content), images, video, games, user-generated content, social networking posts or messages, or the like.

Based on the content of webpage 400, action button 402 and/or action banner 404 may be presented with webpage 400, thereby allowing the user to take one or more online actions regarding a societal issue associated with webpage 400. In one embodiment, action button 402 may be located in conjunction with known social networking buttons such as, but not limited to, those of Twitter™, Facebook™, Google+™, Pinterest™, LinkedIn™, etc. In other words, action button 402 may be added to webpage 400 in a manner similar to that of other social networking buttons, thereby requiring no additional back-end coding or specialized technical skill. Alternatively, or in addition thereto, an action banner 404 may be provided in conjunction with webpage 400. As shown, banner 404 may indicate one or more support actions for the societal issue associated with webpage 400. For example, based on webpage 400 being related to the protection of marine mammals, a related societal issue may be the protection of dolphins in Japan. Accordingly, banner 404 may recommend that the user sign an online petition to support the protection of the dolphins and provide a button 408 that allows the user to do so immediately. In some embodiments, banner 406 may include a link 406 that allows the user to review further support actions that the user may perform online to support the protection of the dolphins.

The action platform herein may illustratively employ one or more of a variety of techniques to derive relevant actions and/or societal issues for users. Specific example techniques include, but are not limited to:
  Semantic analysis;
  Keyword extraction;
  User engagement over time;
  Client prioritization;
  Tag similarity;
  Social network graph similarity;
  Popularity;
  Serving rules;
  Etc.

In particular, the illustrative techniques herein can read content/tags of a current website's content, and make socially relevant recommendations based on a complex matching process for recommendations. For instance, an example recommendation process (e.g., stored in mass storage 318, system memory 314, or cache 304 and executed by processor 302) may take into consideration such factors as an IP address or geo-location of the user, what other actions the user has done before, what other websites the user has visited, the location of a subject of the news article, user profile data of the user (e.g., social networking interests, explicitly entered interests, etc.), and the like. A goal of the recommendation process is to connect content to a related action, allowing users to consume more content and be provided with specific action types based on the initial website content. In some embodiments, the matching of a webpage to a societal issue and/or corresponding support actions may be performed asynchronously, thereby having minimal impact on page load times.

Example inputs to the matching process may include, but are not limited to, the following categories of data:
  1.) Content:
    a.) Keywords
    b.) Semantics
    c.) Sentiment
    d.) Similarity to other content
  2.) Actions:
    a.) Urgency
    b.) Priority
    c.) Trends
  3.) Social Networking Systems:
    a.) Friend graphs
    b.) Social networking actions (e.g., likes, follows, interests, etc.)
  4.) User Profile Data:
    a.) Location
    b.) Demographics
    c.) Content consumption
    d.) Previous action engagement
    e.) Similarity to other users Referring now to FIG. 4B, selection of button 402 or button 404 on webpage 400 shown in FIG. 4A may cause a screen 410 to be displayed. Screen 410 may be an overlay over webpage 400, a popup window, or even a webpage to which browser 202 is redirected, in various embodiments. As shown, assume that the content of webpage 400 is associated with the societal issue of climate change (e.g., a potential reason for the whales being trapped). Screen 410 may present any number of potential support actions to the user, thereby allowing the user to perform an online action in support of the cause of preventing climate change. In one embodiment, selection of option 412 on screen 410 may allow the user to make an online pledge to prevent climate change (e.g., by donating to a particular organization, by pledging to carpool, etc.). In another embodiment, selection of option 414 on screen 410 may allow the user to sign an online petition in support of preventing climate change. In yet another embodiment, selection of option 416 on screen 410 may provide additional information to the user regarding ways to prevent climate change.

According to various embodiments, example online support actions that may be recommended to a user by the recommendation process may include, but are not limited to, online petitions, pledges (e.g., agreeing to do something to support a cause), increasing awareness about the cause (e.g., by reading more about the societal issue), subscribing to an email or text message list, sending support messages to others, donating to an organization, agreeing to volunteer, agreeing to participate in a letter writing campaign, agreeing to attend an event or protest, participating in a social network "takeover," sharing online content regarding the societal issue, commenting on a societal issue, participating in an online content or quiz, playing an online game, providing user-generated content regarding the societal issue, agreeing to participate in fundraising, placing an online vote, participating in an online poll, and any other online action that may be performed to support a given cause.

FIG. 4C illustrates an example online petition, according to one embodiment. For example, in response to the user selecting a particular online support action for a societal issue, browser 202 may present screen 420 that includes additional information about the petition, the organization sponsoring the petition (if applicable), input fields 422 in which the user may provide information about himself or herself, and/or an option 424 to sign the petition. For example, if the corresponding societal issue is the endangerment of the Mexican Gray Wolf, screen 420 may ask that the user petition the U.S. Fish and Wildlife Service (USFWS) to take emergency action to protect the wolves. In some embodiments, screen 420 may also identify a goal associated with the particular online action. For example, screen 420 may indicate that the online petition is currently at 54% of the target number of signers. Such a goal may be set, for example, by the organization or individual that sets up the particular cause and/or action. Said differently, the action platform may monitor performance of the online support action by users, compare the performed actions to a target goal, and provide an indication of how close the goal is to being met.

Figure 4B:
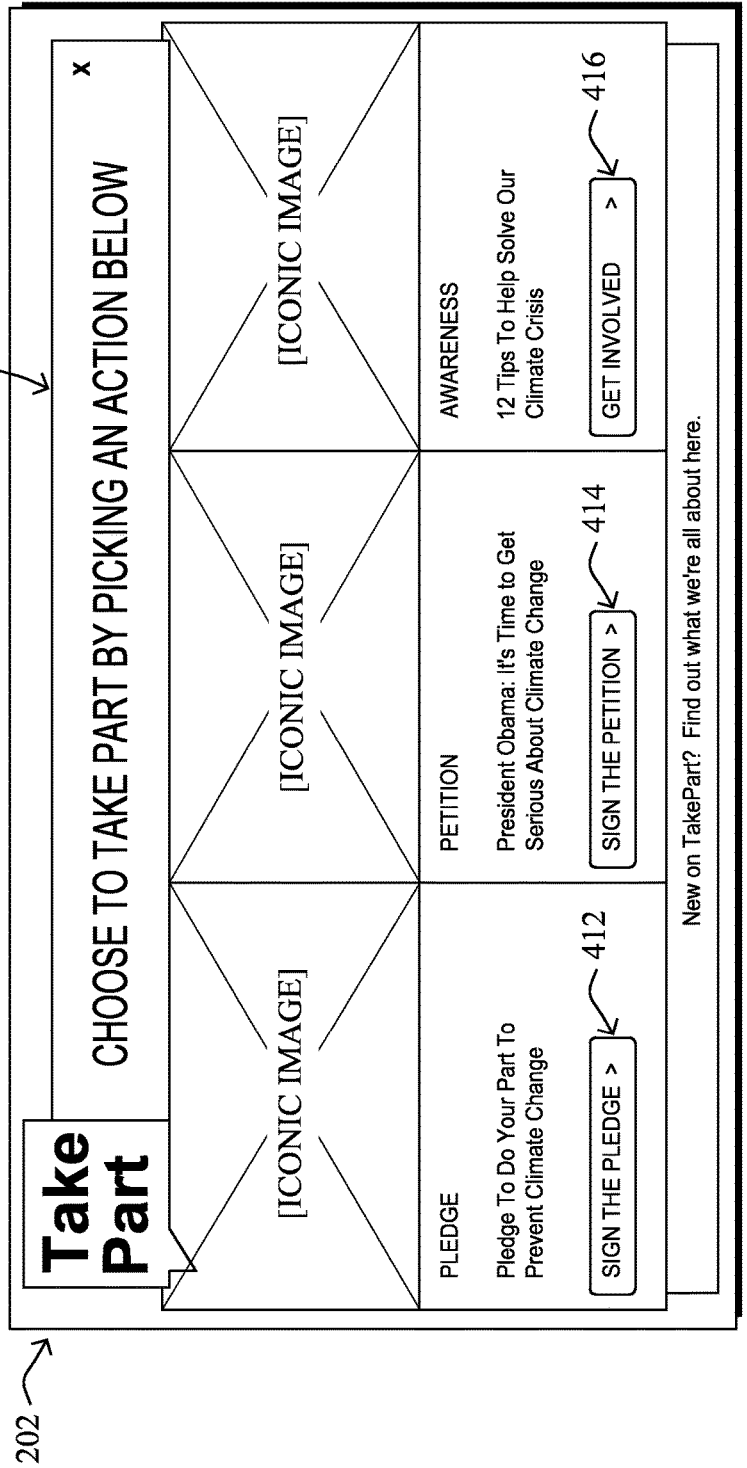
Figure 4D:
Figure 4E:
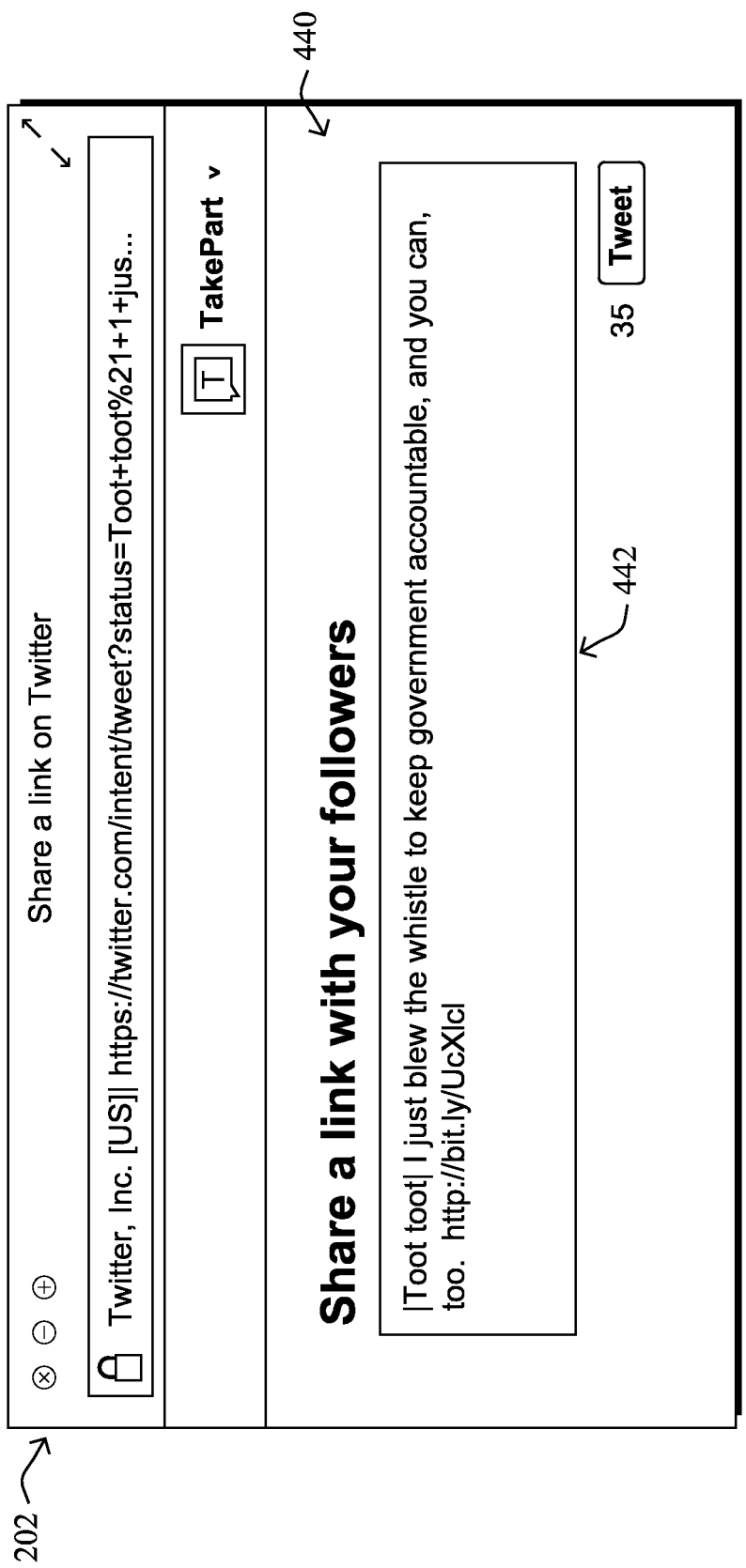

In FIGS. 4D-4E, the action interface may be configured to allow a user to send a message to his or her social connections regarding an online action the user performed in support of a given cause. For example, as shown in FIG. 4D, the interface may provide a screen 430 to web browser 202, in response to the user performing a particular action. Screen 430 may allow the user to interact with one or more connections via a social networking system. Cookies set on client 130 may be associated with a particular social networking account of the user, thereby allowing the action interface to make use of the user's social network directly. For example, as shown in FIG. 4E, selection of a given social networking service (e.g., Twitter™) may cause browser 202 to display webpage 440 of the corresponding social networking service and allow the user to notify his or her social connections regarding the online support action. For example, as shown, screen 440 may include a message input field 442 that allows the user to message his or her social connections via the social networking service. In one embodiment, field 442 may be prepopulated with a hotlink that, when selected, allows another user to perform the same online action in support of the social cause (e.g., by signing a petition, learning more about the cause, etc.).

Figure 4F:

FIG. 4F illustrates an example profile dashboard webpage 450, according to some embodiments. As shown, a given user may have a user profile (e.g., account) registered with the TakeAction Platform, thereby allowing the user to track the causes/societal issues of relevance to the user, the online support actions taken by the user in support of the causes/societal issues, and other related information. For example, the platform may track and report on the user's support actions over time, update the user on the status of a previously performed support action (e.g., the action has achieved its target goal, etc.), provide scoring on the impact of the user's support actions, incentivize the user to participate in a support action (e.g., by awarding the user badges, rewards, or other incentives), tracking and providing tax documentation (e.g., a documented donation to a recognized charitable organization), share and promote the user's support actions with other users, allow the user greater insight into himself or herself based on which causes the user supports, etc.

In one embodiment, information regarding the user (e.g., the user's identity, address, education, interests, social connections, etc.) may be pulled automatically from a social networking service during registration of the user profile. For example, information 452 (e.g., the user's name, image, etc.) may be included on webpage 450. In another embodiment, webpage 450 may include an impact index 454 that tallies the actions performed by the user in support of various causes/societal issues. In a further embodiment, webpage 450 may include update information 456 regarding any causes/societal issues for which the user performed a support action. For example, if the user signed an online petition in support of protecting dolphins in Japan, update information 456 may include any news, benchmarks, etc. regarding the corresponding cause. In yet another embodiment, webpage 450 may include a word cloud 458 that lists the terms that are of particular interest to the user. As would be appreciated, the size of the terms in word cloud 458 may correspond to the frequency/relevancy of the term to the user, based on the user's information (e.g., browsing history, etc.). For example, word cloud 458 may display the term "oceans" prominently, based on the user supporting any number of causes regarding ocean conservation efforts. In another embodiment, webpage 460 may include action recommendations 460 that, based the user's profile information and/or previous actions, suggest additional support actions that the user may wish to perform.

Figure 4G:
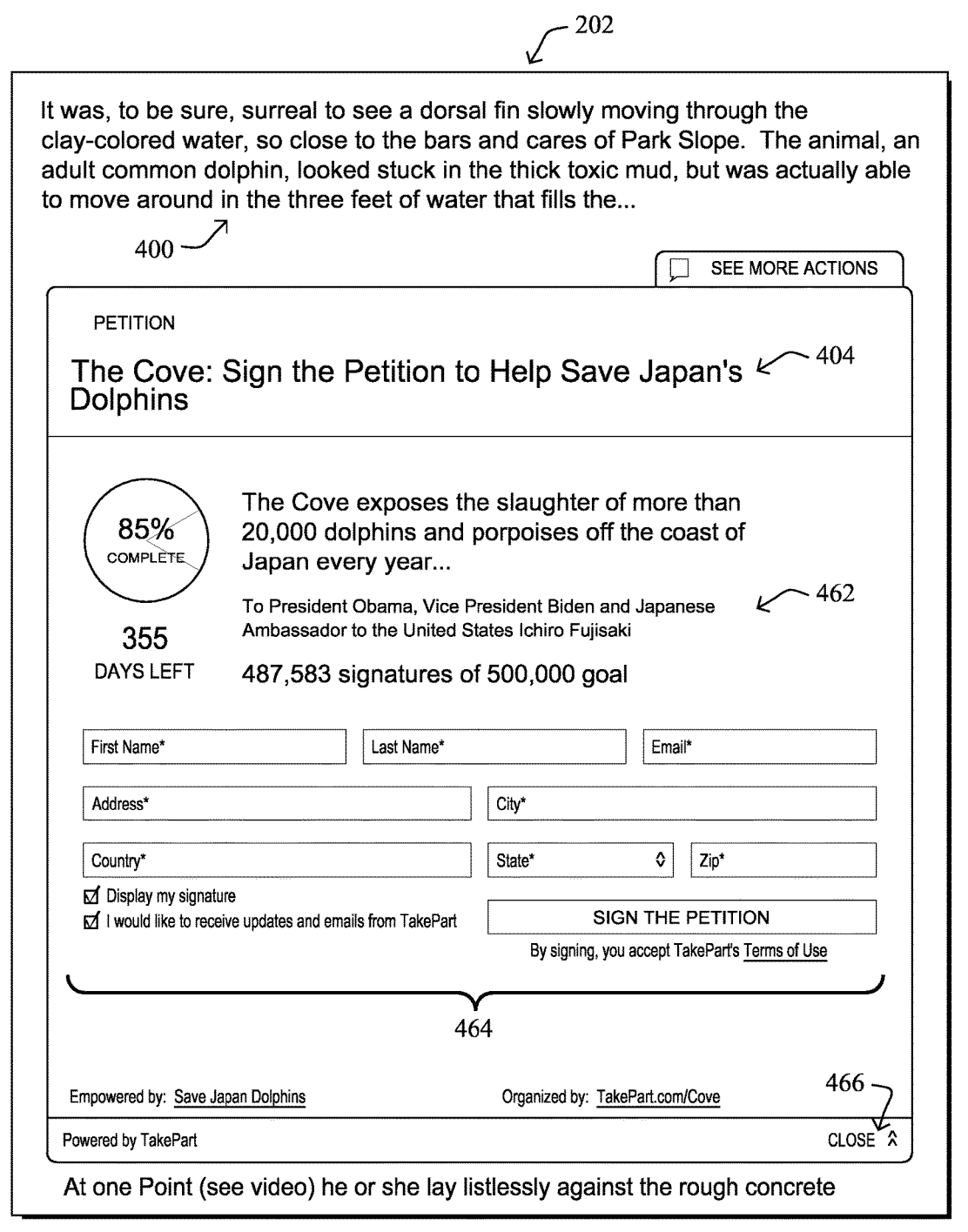

FIG. 4G illustrates action banner 404 in greater detail, according to some embodiments. As shown, action banner 404 may be embedded into webpage 400 such that the user may make an online support action for a cause/relevant societal issue directly on webpage 400 (e.g., as opposed to doing so in another window, in an overlay, on another webpage, etc. via action button 402). For example, assume that the user of webpage 400 selects button 408 to expand action banner 404, as shown in FIG. 4A. In such a case, action banner 404 may be expanded to display a recommended online support action corresponding to the user singing a petition in support of the societal issue of protecting Japan's dolphins (e.g., as selected based on the societal issues present in the article on webpage 400, based on the user's previous actions or preferences, etc.). Accordingly, action banner 404 may include information 462 that describes the subject of the petition and inputs 464 that allow the user to sign and submit the online petition. For example, the user may enter information about himself or herself (e.g., his or her name, contact information, etc.) and select the corresponding input to "sign" the online petition. As shown, inputs 464 may also allow the user to specify whether his or her engagement with the action should be public or private (e.g., whether the user's signature should be displayed on the petition with the user's information), whether the user wishes to be contacted with updates regarding the petition (e.g., when the signature goal is met), whether the user's contact information can be shared with a corresponding organization (e.g., the organization sponsoring the petition) and/or the publisher of the article on webpage 400.

In some embodiments, information 462 in action banner 404 may also indicate the current progress towards any goals associated with the petition. For example, as shown, the petition may have garnered 85% of the target number of signatures and may indicate how much time is left to achieve the goal (e.g., 355 days left). In some cases, action banner 404 may also include a button 466 that, when selected, causes action banner 404 to be collapsed again (e.g., to hide inputs 464, etc.).

As shown in FIG. 4H, a user may also specifically request discovery of additional causes that may be of interest to the user. For example, the user of web browser 202 may navigate to webpage 470 that provides information regarding additional societal issues and online support actions that may be of relevance to the user (e.g., using the recommendation process described above). For example, webpage 470 may include the newest online support actions 472-476 that may be of interest to the user, the top featured online support actions 478-482 of interest to the user, etc. Notably, recommendations 472-482 may take into account the content viewed by the user (e.g., the user viewed articles or other online content regarding a particular societal issue, etc.), online support actions previously performed by the user, actions and/or content suggested to the user by social networking connections of the user, etc. In one embodiment, online support actions 472-482 may also be presented on webpage 470 based in part on how close they are to achieving their respective goals. For example, if a particular petition is within 3% of reaching its associated goal, it may be suggested with a higher frequency so as to achieve the goal.

In further embodiments, webpage 470 may be configured to allow the user to navigate online support actions by category. For example, if the user is particularly interested in the societal issue of climate change, he or she may use webpage 470 to navigate to any online support actions that correspond to this issue. Thus, in some implementations, the user may be presented with all available online support actions, as opposed to only a filtered subset of actions based on the user's potential interests.

An online support action may be established by any number of organizations. For example, a nonprofit organization, political campaign, group, content publisher, brand, consumer, or the like may establish an account with the system to create new causes and online actions in support of a cause. The system may also be configured to allow screening of any participating organization or individual. For example, a societal issue/cause or online support action may be screened either automatically (e.g., to filter out inappropriate or offensive causes or actions, etc.) or manually (e.g., by providing details regarding the issue or action to an electronic display for review by an administrator).

In various embodiments, the system may also be configured to promote, track, and report on the status of a given cause and/or online support action. For example, the system may generate an impact score (e.g., a measure of participation in an action relative to a goal), action recommendations (e.g., by recommending an online support action to users), content recommendations for users, rewards and incentives (e.g., to incentivize users to become active in a given cause), user engagement analytics, action updates, a tag/word cloud, a list of followers or supporters of the cause, alerts, social networking connection activity reports, trends, or the like.

Figure 5:
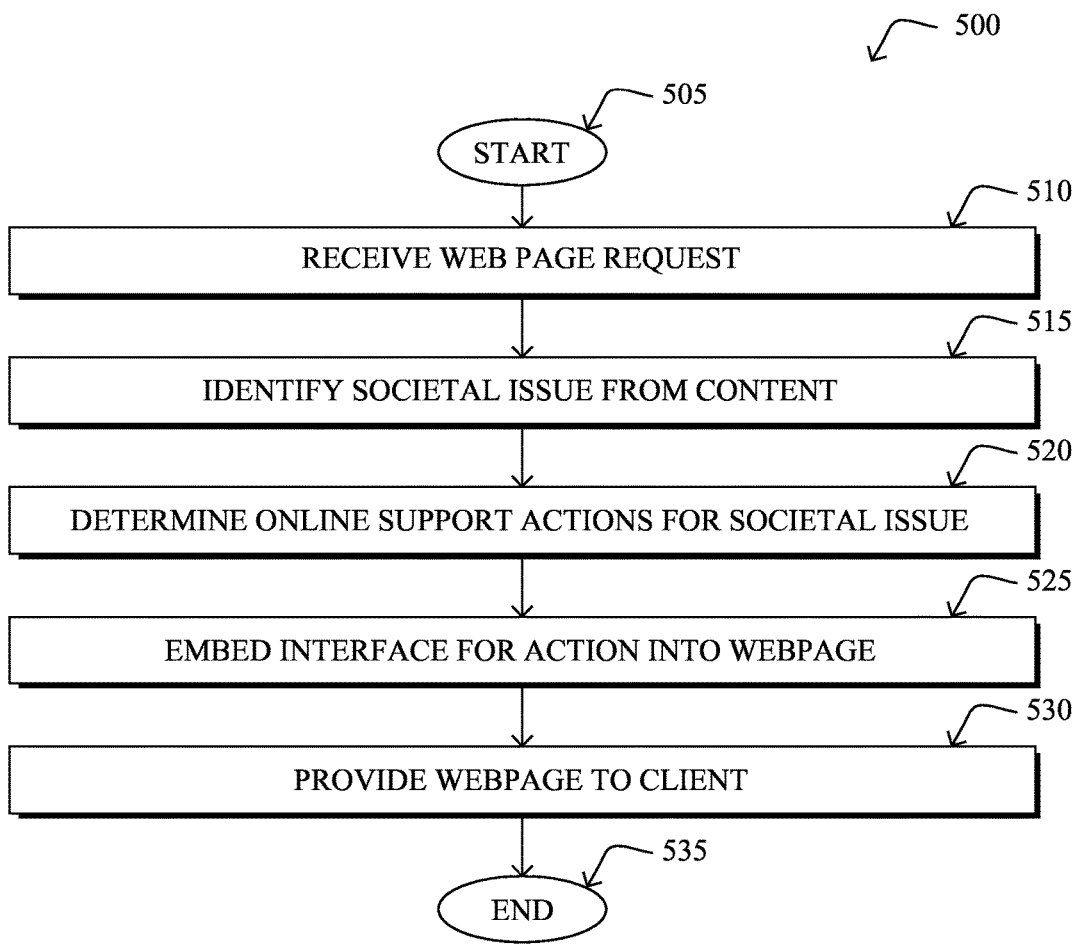
FIG. 5 illustrates an example simplified procedure for providing a webpage.

FIG. 5 illustrates an example simplified procedure 500 for providing a webpage, according to various embodiments. Procedure 500 may be performed by any of the devices described herein such as web server(s) 120 or in a distributed manner across multiple devices as part of a computing system. Procedure 500 may start at step 505 and continue on to step 510 where, as described in greater detail above, the device receives a webpage request from a client device. For example, the device may receive a request for a specific URL or other web address.

At step 515, the device identifies one or more societal issues from the content, as detailed above. In general, a societal issue refers to a political, environmental, scientific, etc., issue of particular importance to a society (e.g., on a global scale, national scale, local scale, etc.). For example, an article containing content regarding a recent earthquake may be analyzed to identify the occurrence of the earthquake as a societal issue. In some embodiments, a societal issue may be directly associated with the content of the requested webpage. In other embodiments, the societal issue may be tangentially associated with the content of the webpage. For example, assume that the webpage includes an article about efforts to protect the right whale from extinction. In such a case, the content of the webpage may be directly associated with the protection of the right whale and tangentially associated with other issues such as the protection of other oceanic animals, preventing pollution in the oceans, protecting endangered species, or the like.

At step 520, the device determines a set of one or more online support actions for a societal issue identified in step 515, as detailed above. In some embodiments, the societal issue may be selected from among a set of societal issues based in part on user profile data (e.g., previous content or actions performed by the user, social networking actions performed by the user or connections of the user, demographics or location information for the user, etc.). In general, the set of one or more online support actions may be specified by one or more organizations, individuals, etc. that initiate the type of support action. For example, a non-profit organization may set up an online petition regarding a particular societal issue.

At step 525, the device embeds an interface for a particular online support action into the webpage, as detailed above. For example, a widget may be embedded into the requested webpage that provides an interface to the user to perform the one particular online support action. In one embodiment, an action button may be embedded onto the webpage. For example, the action button may be placed near other social networking-related buttons (e.g., a Facebook™ icon, etc.) and, when selected, causes the particular online support action to be presented (e.g., as an overlay over the webpage, on a redirected webpage, in a popup window, etc.). In another embodiment, an action banner may be embedded into the webpage that allows the user to perform the online support action directly within the banner. For example, the user may be able to pledge his or her support for a certain cause directly on the webpage itself within the action banner.

At step 530, the device provides the requested webpage with the embedded interface to the client device, as described in greater detail above. Notably, the interface may alert the user as to the societal issue and allow the user to perform one or more online actions in support of a related cause. For example, the interface may be configured to allow the user to sign an online petition in support of a given cause, pledge support for the cause, etc., via the interface. Procedure 500 then ends at step 535.

According to the techniques herein, therefore, socially relevant content may be matched automatically to a collection of meaningful actions that may be performed by a user in support of a given cause. In some aspects, the user may promote and/or keep track of the impact of his or her support actions (e.g., the system may collect and maintain metrics regarding the support actions performed by the user, any goals associated with the support actions, etc.). In further aspects, the system may provide metrics or other information to a content publisher or organization/user associated with the societal issue (e.g., user contact information, engagement statistics, goal metrics for a support action, etc.).

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

In particular, the foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible (non-transitory) computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server. For example, further implementations may embody an application-based interface (e.g., a mobile "app"), functionality present in a set-top box, or any other interface presented on a networked computing device.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
receiving, at a device, a request for a webpage from a client device via a network;
identifying, by the device, a societal issue associated with content of the webpage by selecting, by the device, the societal issue from among a plurality of societal issues based in part on the user profile data;
determining, by the device, a set of one or more online support actions associated with the identified societal issue by selecting, by the device, a particular online support action based in part on user profile data associated with the client device;
embedding, by the device, an interface comprising a banner, actionable in real time, for a particular one of the set of online support actions into the webpage, wherein the banner enables the user to make an online support action for the societal issue directly on the webpage; and;
providing, by the device, the requested webpage with the embedded interface to the client device via the network.

2. The method as in claim 1, wherein the particular online support action comprises signing an online petition regarding the societal issue.

3. The method as in claim 1, wherein the particular online support action comprises pledging to support a cause associated with the societal issue.

4. The method as in claim 1, wherein the interface is configured to send a social networking message regarding the particular online support action, in response to the particular online support action being performed.

5. The method as in claim 1, further comprising:
aggregating, by the device, metrics for online support actions performed by a particular user profile; and
providing, by the device, a dashboard interface to the client device, wherein the dashboard interface is configured to present the aggregated metrics for the online support actions performed by the particular user profile and to recommend additional online support actions based on the performed online support actions.

6. The method as in claim 1, further comprising:
receiving, at the device, data indicative of a goal associated with the particular online support action;
detecting, by the device, performance of the particular online support action; and
providing, by the device, metrics regarding the monitored performance of the particular online support action relative to the goal.

7. An apparatus, comprising:
one or more network interfaces to communicate with a network;
a processor coupled to the network interfaces and adapted to execute one or more processes; and
a memory configured to store a process executable by the processor, the process when executed operable to:
receive a request for a webpage from a client device via the network;
identify a societal issue associated with content of the webpage by selecting the societal issue from among a plurality of societal issues based in part on the user profile data;

determine a set of one or more online support actions associated with the identified societal issue by selecting a particular online support action based in part on user profile data associated with the client device;

embed an interface comprising a banner, actionable in real time, for a particular one of the set of online support actions into the webpage, wherein the banner enables the user to make an online support action for the societal issue directly on the webpage; and provide the requested webpage with the embedded interface to the client device via the network.

8. The apparatus as in claim 7, wherein the particular online support action comprises signing an online petition regarding the societal issue.

9. The apparatus as in claim 7, wherein the particular online support action comprises pledging to support a cause associated with the societal issue.

10. The apparatus as in claim 7, wherein the interface is configured to send a social networking message regarding the particular online support action, in response to the particular online support action being performed.

11. The apparatus as in claim 7, wherein the process when executed is further operable to:

aggregate metrics for online support actions performed by a particular user profile; and provide a dashboard interface to the client device, wherein the dashboard interface is configured to present the aggregated metrics for the online support actions performed by the particular user profile and to recommend additional online support actions based on the performed online support actions.

12. The apparatus as in claim 7, wherein the process when executed is further operable to:

receive data indicative of a goal associated with the particular online support action;

detect performance of the particular online support action; and provide metrics regarding the monitored performance of the particular online support action relative to the goal.

13. A tangible, non-transitory, computer-readable media having machine instructions encoded thereon, the instructions when executed by a processor operable to:

receive a request for a webpage from a client device via the network;

identify a societal issue associated with content of the webpage by selecting the societal issue from among a plurality of societal issues based in part on the user profile data;

determine a set of one or more online support actions associated with the identified societal issue by selecting a particular online support action based in part on user profile data associated with the client device;

embed an interface comprising a banner, actionable in real time, for a particular one of the set of online support actions into the webpage, wherein the banner enables the user to make an online support action for the societal issue directly on the webpage; and provide the requested webpage with the embedded interface to the client device via the network.

14. The computer-readable media of claim 13, wherein the particular online support action comprises signing an online petition regarding the societal issue.

15. The computer-readable media of claim 13, wherein the particular online support action comprises pledging to support a cause associated with the societal issue.

16. The computer-readable media of claim 13, wherein the interface is configured to send a social networking message regarding the particular online support action, in response to the particular online support action being performed.

17. The computer-readable media of claim 13, wherein the instructions when executed by the processor are further operable to:

aggregate metrics for online support actions performed by a particular user profile; and provide a dashboard interface to the client device, wherein the dashboard interface is configured to present the aggregated metrics for the online support actions performed by the particular user profile and to recommend additional online support actions based on the performed online support actions.

* * * * *